United States Patent [19]

Horiuchi

[11] 4,203,139

[45] May 13, 1980

[54] PLAY/RECORD SWITCHING CIRCUIT FOR A SIGNAL REPRODUCING AND RECORDING APPARATUS

[75] Inventor: Harumi Horiuchi, Yokohama, Japan

[73] Assignee: Soundesign Corporation, Jersey City, N.J.

[21] Appl. No.: 933,268

[22] Filed: Aug. 14, 1978

[30] Foreign Application Priority Data

Sep. 10, 1977 [JP] Japan .................... 52-109154

[51] Int. Cl.$^2$ .................................... G11B 15/12
[52] U.S. Cl. .................................... 360/62; 360/61
[58] Field of Search .................................... 360/62, 61

[56] References Cited

U.S. PATENT DOCUMENTS

| | | | |
|---|---|---|---|
| 3,347,996 | 10/1967 | Uchikoshi | 360/62 |
| 3,810,135 | 5/1974 | Kawakami et al. | 360/62 |
| 3,930,266 | 12/1975 | Okamoro | 360/62 |
| 3,959,817 | 5/1976 | Honjo et al. | 360/62 |

*Primary Examiner*—Vincent P. Canney

*Attorney, Agent, or Firm*—Kirschstein, Kirschstein, Ottinger & Cobrin

[57] ABSTRACT

A play/record switching circuit for an electrical signal reproducing and recording apparatus having inputs for source data signals and a microphone data signal, and a tape head for generating a tape head reproducing signal and for receiving one of the data signals to be recorded. The circuit includes one mechanical switch for selecting one of said signals, another mechanical switch for selecting either a play or a record mode, and electrical amplifiers for processing the various signals and for monitoring the processed signals. Positive- and negative- logic-controlled electronic bilateral switches are controlled by a D.C. voltage control signal for selecting the appropriate processing amplifier and the appropriate monitor amplifier in dependence upon which mode has been selected and which signal has been selected by both mechanical switches. The electronic amplifiers and the bilateral switches and the D.C. control signal circuitry are all incorporated on a single integrated circuit chip.

12 Claims, 1 Drawing Figure

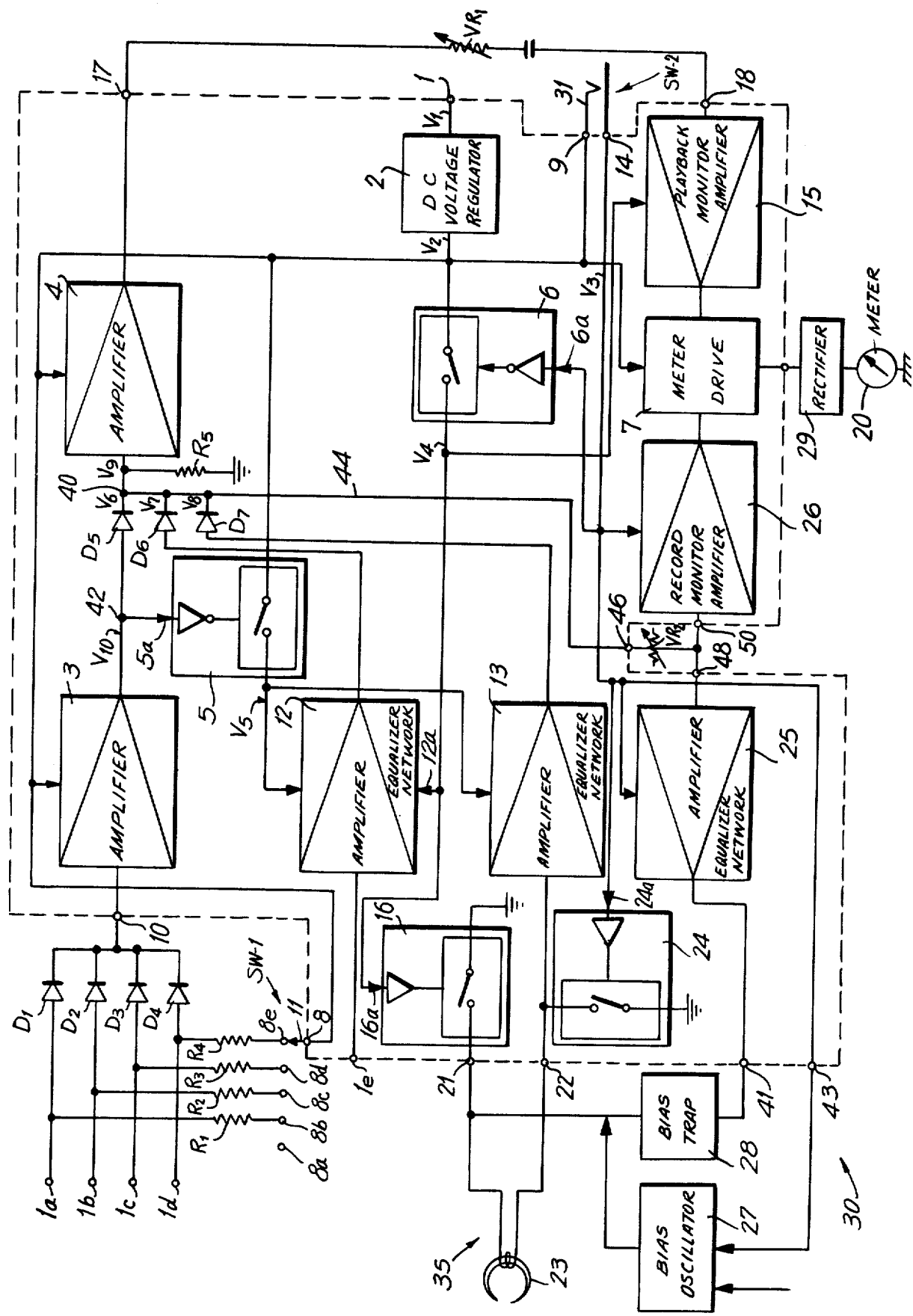

PLAY/RECORD SWITCHING CIRCUIT FOR A SIGNAL REPRODUCING AND RECORDING APPARATUS

BACKGROUND OF THE INVENTION

1. Field of the Invention

The present invention generally relates to electrical signal reproducing and recording apparatus and, more particularly, to a play/record switching circuit for such apparatus of the type having inputs for a plurality of source data signals and a microphone data signal, and a tape head arrangement for generating a tape head reproducing signal and for receiving one of the data signals to be recorded.

2. Description of the Prior Art

It has been proposed to employ a play/record switching circuit in an electrical signal reproducing and recording apparatus such as the receiver section of a tape recorder. This proposed switching circuit is actuated by a conventional play-record button to simultaneously perform many different functions.

For example, depending upon whether the play or the record mode is selected by the button, the reproducing/recording tape head is disabled or enabled relative to the appropriate electronic amplifier components, the bias oscillator and bias trap are disabled or enabled relative to the erase head and the reproducing-/recording tape head, the record indicator light is disabled or enabled, the source data signals are disabled or enabled relative to the appropriate electronic amplifier components, the microphone data signal is disabled or enabled relative to the appropriate electronic amplifier components, the appropriate equalizer networks for the microphone and tape head reproducing and recording amplifiers are disabled or enabled, the ground connection across the reproducing/recording tape head is reversed, and the program indicator lights for an 8 track deck for the microphone data signal or the source data signals are actuated or deactuated, just to mention a few possible functions for the known switching circuit.

This proposed switching circuit effects the above-described functions by a very complex multi-pole or multi-section rotary mechanical switch having a plurality of wafer sections. The known mechanical multi-part switch is of large size and has a complicated construction due in part to the many functions which the switching circuit is called on to perform. The multi-part switch requires a multitude of wires extending from the various wafer sections of the switch to the various components to be disabled or enabled. This means in turn that a multitude of soldering processes are necessary to assemble the switching circuit.

Although the known multi-part switches are generally adequate for their intended purposes, they have not proven to be altogether practical in operation. Many man-hours are needed to assemble the complex switch. Mechanical failure is prevalent because the many solder connections and attendant oxidation with time increase the failure rate and decrease the overall reliability of the switching circuit. The control circuitry inter-connection with the switch is complicated and requires expert technical personnel. Moreover, due to intercoupling between the multitude of wires, an undesirably high noise level is obtained. Furthermore, it is difficult to reliably actuate the apparatus with a remote control device due to the multitude of mechanical switch sections within the known switching circuit.

SUMMARY OF THE INVENTION

1. Objects of the Invention

Accordingly, it is the general object of the present invention to overcome the above-identified drawbacks of the prior art.

It is another object of the present invention to reduce the complexity of such known mechanical multi-part circuits.

Still another object of the present invention is to eliminate the number of mechanical movable contact switch sections in such switching circuits.

A further object of the present invention is to increase the reliability and working lifetime of such switching circuits.

Still a further object of the present invention is to provide a light-weight, small, inexpensive, maintenance-free electronic switching circuit to replace the multi-part complex mechanical switching circuits of the prior art.

2. Brief Description of the Invention

In keeping with these objects and others which will become apparent hereinafter, one feature of the invention resides, briefly stated, in a play or record switching circuit for an electrical signal reproducing and recording apparatus of the type having inputs for a plurality of source data signals and a microphone data signal. The apparatus includes tape head means for generating a tape head reproducing signal and for receiving one of the data signals for recording purposes.

In accordance with the invention, the switching circuit comprises switching-state selector means operative for selecting between a first switching state in which one of the source data signals is selected, and a second switching state in which one of said microphone data signal and said tape head reproducing signal is selected. A mode-selector switch is operative for selecting between a play and a record mode of operation for the apparatus.

The switching circuit further comprises first electronic means for processing the selected one of the source data signals to thereby generate a processed source data signal, second electronic means for processing the selected microphone data signal to thereby generate a processed microphone data signal, third electronic means for processing the selected tape head reproducing signal to thereby generate a processed tape head reproducing signal in the play mode, and fourth electronic means for processing one of said data signals to be recorded by the tape head means in the record mode.

The switching circuit still further comprises electronic means for generating a D.C. voltage signal, and electronic switching means for selecting at least one of the processing means in dependence upon the selected switching state and the selected mode of operation. The switching means include logic-controlled electronic bilateral switches which are operative in dependence upon the magnitude of the control signal for selecting the first processing means in the play mode upon selection of the first switching state, for selecting the third processing means in the play mode upon selection of the second switching state, for selecting the first and fourth processing means in the record mode upon selection of the first switching state, and for selecting the second and fourth processing means in the record mode upon selection of the second switching state.

In still further accordance with the present invention, a monitoring arrangement includes a monitor reproducing amplifier and a monitor recording amplifier. The monitor reproducing amplifier is selected by the electronic switching means in dependence upon the magnitude of the D.C. control signal for monitoring the processed source data signal in the play mode upon selection of the first switching state, and for monitoring the processed tape head reproducing signal in the play mode upon selection of the second switching state. The monitor recording amplifier is also selected by the electronic switching means in dependence upon the magnitude of the D.C. control signal for monitoring the processed source data signal in the record mode upon selection of the first switching state, and for monitoring the processed microphone data signal in the record mode upon selection of the second switching state.

All of the above-identified processing means, control signal-generating means, bilateral switches, and monitoring amplifiers are all electronic in nature and are all incorporated on a single integrated circuit chip. This insures that the switching circuit of the present invention is light-weight, small, inexpensive to manufacture, and virtually maintenance-free. The utilization of logic-controlled bilateral switches to perform the aforementioned switching functions overcomes the complex and multi-part mechanical construction of the known mechanical multi-part switch. The multitude of wires, wafer sections and solder connections are thereby eliminated. Reliability problems and size constraints are no longer major design considerations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic circuit diagram of the play/record switching circuit in accordance with the present invention.

DESCRIPTION OF THE PREFERRED EMBODIMENTS

Referring now to the single FIGURE, reference numeral 30 generally identifies the play/record switching circuit for the receiver section of an electrical signal reproducing and recording apparatus, such as a tape recorder. This apparatus has a plurality of input terminals 1a, 1b, 1c, 1d for a corresponding plurality of source data signals. Each source data signal may be any electrical signal bearing information from any sound source. For exemplary purposes only, input terminal 1a is a tuner input, preferably for an AM radio signal; input terminal 1b is another tuner input, preferably for an FM radio signal; input terminal 1c is a phono input, preferably for a phonograph equipped with any type of cartridge; and input terminal 1d is an auxiliary input, preferably for any electrical signal bearing sound information derived for example, from a speech or music source. Of course, other input terminals could be provided to accommodate other source data signals; for example, a tape input terminal preferably for a remote tape deck could be provided. It would be understood that the number and kind of input terminals described above are illustrative only and have been provided merely to aid the foregoing description of the structure and function of the switching circuit 30.

The apparatus still further includes input terminal 1e for a microphone data signal, and built-in tape head means 35. The tape head means 35 includes a reproducing/recording tape head 23 having coil terminals 21, 22, a bias oscillator 27 and a bias trap 28. These components of the tape head means are entirely conventional and are operative for generating a tape head reproducing output signal, and for receiving one of the aforementioned data signals for recording purposes from any one of the input terminals 1a-1e to thereby generate a tape head recording input signal, as will be explained below.

In order to select one of the source data signals or the microphone data signal or the tape head reproducing output signal, a switching-state selector switch SW-1 is provided. Switch SW-1 is a mechanical switch and has a manually-movable armature or arm 11 having one end permanently electrically connected with terminal 8 and its other end mounted for movement between a plurality of switch terminals 8a, 8b, 8c, 8d, 8e. Resistors $R_1$, $R_2$, $R_3$, $R_4$ are respectively connected between switch terminals 8b, 8c, 8d, 8e and input terminals 1a, 1b, 1c, 1d respectively. When the arm 11 is moved to any one of switch terminals 8b, 8c, 8d, 8e, the respectively associated source data signal is selected, and this action constitutes the selection of a first switching state. In this first switching state, the selected source data signal may be either reproduced or recorded depending upon whether the play or the record mode is selected for the apparatus, as will be described below.

Switch terminal 8a is an open terminal, that is to say no resistor or other electrical component will normally be electrically connected to terminal 8. When arm 11 is moved to switch terminal 8a, none of the source data signals are selected, and this action constitutes the selection of a second switching state. In this second switching state, the microphone data signal can be applied to input terminal 1e for recording purposes, or the tape head reproducing output signal can be applied to coil terminals 21, 22 for reproducing purposes, as will be described below.

In order to select the play or record operational mode of the apparatus, a single-pole, single-throw mechanical switch SW-2 having a manually-movable armature or arm 31 is mounted for movement between two switch terminals 9, 14. When arm 31 has been moved so that switch terminals 9, 14 are not in electrical communication with each other, the play mode has been selected; when arm 31 has been moved so that terminals 9, 14 are placed in electrical communication with each other, the record mode has been selected.

Once the proper mode and switching state have been selected by mechanical switches SW-1 and SW-2, the proper processing circuitry is needed to process the various signals. First electronic processing means or sound reproducing amplifiers 3, 4 are connected in series for amplifying the selected one of the source data signals. The source data signal selected by switch SW-1 is applied to input terminal 10, and the amplifiers 3, 4 generate an amplified source data signal at output terminal 17. Second electronic processing means or sound recording amplifier 12 with microphone equalizer network circuitry is operative for amplifying the microphone data signal (selected by switch SW-1 when arm 11 is at terminal 8a). The amplified microphone data signal at terminal 1e is conducted to junction 40. Third electronic processing means or sound reproducing amplifier 13 with equalizer network circuitry is connected between terminal 22 and junction 40, and the amplifier 13 is operative for amplifying the tape head reproducing output signal to thereby generate an amplified tape head reproducing output signal at junction 40. Fourth electronic processing means or sound recording amplifier 25 with equalizer network circuitry is connected between terminal 41 and junction 40, and amplifier 25 is operative for amplifying the selected one of the data signals (i.e., any one of the source data signals or the microphone data signal) at junction 40 to thereby generate a tape head recording input signal to be applied to terminal 41.

It is now necessary to select the appropriate amplifiers in dependence upon which switching state and which mode is chosen. The electronic switching means of the present invention selects the appropriate amplifier in dependence upon the presence or absence of a D.C. voltage control signal. A non-regulated supply voltage $V_1$ at terminal 1 is applied to a fixed-voltage regulator 2 to thereby generate a D.C. voltage control signal $V_2$. This D.C. signal is used not only as a supply voltage for the aforementioned amplifiers, but also to control logic-controlled electronic switches 5, 6, 16, 24 in dependence upon the presence or absence of the control signal. Electronic switches 5 and 6 are negative logic-controlled bilateral switches, and electronic switches 16 and 24 are positive logic-controlled bilateral switches.

The electronic bilateral switches are arranged such that in a first operating condition amplifiers 3, 4 are selected upon selection of the play mode by switch SW-2 and upon selection of the first switching state by switch SW-1; the other amplifiers 12, 13, 25 are not selected in said first operting condition. In a second operating condition, the electronic bilateral switches select amplifier 13 upon selection of the play mode by switch SW-2 and upon selection of the second switching state by switch SW-1; the other amplifiers 3, 12 and 25 are not selected in said second operating condition. In a third operating condition, the electronic bilateral switches select amplifiers 3 and 25 upon selection of the record mode by switch SW-2 and upon selection of the first switching state by switch SW-1; the other amplifiers 12, 13 are not selected in said third operating condition. In a fourth operating condition, the electronic bilateral switches select amplifiers 12 and 25 upon selection of the record mode by switch SW-2 and upon selection of the second switching state by switch SW-1; the other amplifiers 3, 13 are not selected in said fourth operating condition. The specific switching actions which are performed for each of the aforesaid operating conditions will be separately discussed in detail below.

In further accordance with the invention, means are provided for monitoring the selected processed signal. The monitoring means includes monitor reproducing means or play-back monitor amplifier 15, monitor recording means or record monitor amplifier 26, meter drive 7, rectifier 29 and meter 20.

The electronic bilateral switches are operative such that play-back amplifier 15 is selected in the first operating condition to monitor the amplitude of the amplified source data signal to be reproduced, and play-back amplifier 15 is also selected in the second operating condition to monitor the amplitude of the amplified tape head reproducing output signal to be reproduced. The electronic bilateral switches select the record monitor amplifier 26 in the third operating condition to monitor the amplified source data signal to be recorded, and in the fourth operating condition to monitor the amplified microphone data signal to be recorded.

All of the components enclosed by the dashed lines in the single FIGURE are electronic in nature and all are incorporated on a single integrated circuit chip. In a one channel application, only the illustrated switching circuit is necessary. Two or four identical switching circuits would be necessary for 2-channel or 4-channel stereo applications.

Regardless of the number of switching circuit required for multiple channel operation, the same single external switch SW-1 and the same single external switch SW-2 can be respectively utilized to operate all of the switching circuit in common.

1. First Operating Condition

In the first operating condition, the play mode has been selected by switch SW-2, and the first switching state has been selected by switch SW-1. For exemplary purposes only, let us assume that arm 11 has been moved to switch terminal 8e to thereby select a source data signal which is supplied to input terminal 1d. The D.C. control voltage $V_2$ is simultaneously supplied by electrically conductive paths to supply bias voltage to amplifiers 3 and 4, to one side of bilateral switch 5, to one side of bilateral switch 6, to switch terminal 9, to meter drive circuit 7, and to switch terminal 8. The control voltage $V_2$ passes through resistor $R_4$ and forwardly biases diode $D_4$ into conduction. In an analogous manner, if switch terminals 8b, 8c, 8d were chosen, then the control voltage $V_2$ would bias diodes $D_1$, $D_2$, $D_3$ respectively into forward conduction. It will be noted that when diode $D_4$ is in the forwardly biased state, the other diodes $D_1$, $D_2$, $D_3$ are reverse-biased. This insures a high isolation characteristic from the other non-selected source data signals. The apparent input impedance at common input terminal 10 is selected to be relatively high due to a constant-current sink circuit built into amplifier 3. The input impedance at input terminal 1d is defined by resistor $R_4$ which also serves as the bias resistor for amplifier 3. Once the diode $D_4$ is forwardly biased, the source data signal is conducted through the diode $D_4$ and is thereupon conducted from common terminal 10 for application in amplifier 3 to thereby generate voltage $V_{10}$ at junction 42 at the output end of amplifier 3.

Voltage $V_{10}$ forwardly biases diode $D_5$ to thereby generate voltage $V_6$ at junction 40. A current signal flows through resistor $R_5$. Voltage $V_9$ across resistor $R_5$ is applied as a bias voltage which permits amplifier 4 to reach a proper operation point. Voltage $V_9$ is amplified by amplifier 4 and is conducted to output terminal 17.

Voltage $V_{10}$ is also applied to the control input 5a of negative logic-controlled switch 5 to thereby open the latter. Put another way, voltage $V_5$ is at zero magnitude, and therefore amplifier 12 and amplifier 13 are not provided with any supply bias voltage. Accordingly, amplifiers 12 and 13 are not operative and voltages $V_7$ and $V_8$ at the diodes $D_6$ and $D_7$ are at zero magnitude. The voltage $V_9$ reverse biases diodes $D_6$ and $D_7$, and therefore only the signal led through diode $D_5$ is fed to amplifier 4.

The open position of switch SW-2 means that voltage $V_3$ is at zero magnitude. No supply bias is provided for record monitor amplifier 26. Voltage $V_3$ of zero magnitude is applied to control input 6a of negative logic-controlled switch 6 to thereby close the same. Voltage $V_2$ passes through switch 6, and the generated voltage $V_4$ has a magnitude corresponding to the predetermined magnitude of the control voltage $V_2$. Voltage $V_4$ is now conducted to play-back monitor amplifier 15 to supply bias to the latter, and also to input 12a of amplifier 12 to cutoff the latter, and also to control input 16a of positive logic-controlled switch 16 to close the latter and short terminal 21 to ground. Voltage $V_3$ of zero magnitude is also applied to control input 24a of positive logic-controlled switch 24 to open the latter and connect terminal 22 directly to amplifier 13. Voltage $V_3$ of zero magnitude is still further applied as a bias voltage to amplifier 25 to prevent the latter from operating.

Since amplifiers 12, 13, 25 and 26 are all inoperative, and only amplifiers 3, 4 and 15 are functioning, the selected source data signal is conducted past terminal 17, and the gain of this signal is adjusted by play-back meter calibration device or variable resistor $VR_1$. The adjusted signal is fed back to terminal 18 and thereupon passes through amplifier 15, meter drive 7, rectifier 29 and meter 20. The pointer of meter 20 deflects to thereby indicate the monitoring level of the output play-back voltage of the selected source data signal.

2. Second Operating Condition

In the second operating condition, the play mode has been selected by switch SW-2, and the second switching state has been selected by switch SW-1. Arm 11 has been moved to switch terminal 8a to thereby select either the microphone data signal at terminal 1e or the tape head reproducing output signal at terminal 22. Let us assume that the tape head reproducing output signal has been selected for play-back purposes. The D.C. control voltage $V_2$ is again supplied to all the components previously mentioned for the first operating condition. However, in this case, voltage $V_2$ at terminal 8 does not pass through any resistor, and no signal is present at common input terminal 10. This means that voltage $V_{10}$ is of zero magnitude and is applied to bilateral switch 5 to thereby close the latter. Control voltage $V_2$ therefore passes through switch 5, and the generated voltage $V_5$ has a magnitude corresponding to the predetermined magnitude of the control voltage $V_2$. Voltage $V_5$ is conducted to both amplifier 12 and amplifier 13 to supply bias to the latter.

The open position of switch SW-2 means that the voltage $V_3$ is at zero magnitude. No supply bias is provided for record monitor amplifier 26. Voltage $V_3$ of zero magnitude is applied to control input 6a of negative logic-controlled switch 6 to thereby close the same. Voltage $V_2$ passes through switch 6, and the generated voltage $V_4$ has a magnitude corresponding to the predetermined magnitude of the control voltage $V_2$. Voltage $V_4$ is now conducted to play-back monitor amplifier 15 to supply bias to the latter, and also to input 12a of amplifier 12 to cutoff the latter, and also to control input 16a of switch 16 to close the latter and short terminal 21 to ground. Voltage $V_3$ of zero magnitude is also applied to control input 24a of positive logic-controlled switch 24 to open the latter and connect terminal 22 directly to amplifier 13. Voltage $V_3$ of zero magnitude is still further applied as a bias voltage to amplifier 25 to prevent the latter from operating.

Since amplifiers 3, 12 and 26 are all inoperative, and only amplifiers 13 and 15 are functioning, the tape head reproducing output signal is conducted from terminal 22, thereupon amplified in amplifier 13, and thereupon conducted past diode $D_7$ where voltage $V_8$ is generated at junction 40. Since amplifiers 3 and 12 are inoperative, voltages $V_6$ and $V_7$ are of zero magnitude, and diodes $D_5$ and $D_6$ are reverse-biased. Only voltage $V_8$ is conducted through resistor $R_5$ and amplifier 4 before being conducted past terminal 17. The gain of this signal is again adjusted by variable resistor $VR_1$, and the adjusted signal is fed to terminal 18 before passing through amplifier 15, meter drive circuit 7, rectifier 29 and meter 20. The pointer of meter 20 deflects to thereby indicate the output play-back voltage level of the tape head reproducing output signal.

3. Third Operating Condition

In the third operating condition, the record mode has been selected by switch SW-2, and the first switching state has been selected by switch SW-1. Again, for exemplary purposes only, assume that arm 11 has been moved to switch terminal 8e to thereby select the source data signal which is applied to input terminal 1d. The control voltage $V_2$ is again supplied to all of the components previously mentioned for the first operating condition. The control voltage $V_2$ passes through resistor $R_4$ and forwardly biases diode $D_4$ into conduction. In a analogous manner, if switch terminals 8b, 8c or 8d were chosen, then the control voltage $V_2$ would bias diodes $D_1$, $D_2$, $D_3$ respectively into forward conduction. Once diode $D_4$ is in the forwardly biased state, the other diodes $D_1$, $D_2$, $D_3$ are reverse-biased. Once the diode $D_4$ is forwardly biased, the source data signal is conducted through diode $D_4$ and is thereupon conducted from common terminal 10 for amplification in amplifier 3 to thereby generate voltage $V_{10}$ at junction 42 at the output end of amplifier 3. Voltage $V_{10}$ forwardly biases diode $D_5$ to thereby generate voltage $V_6$ at junction 40.

Voltage $V_{10}$ is also applied to the control input 5a of switch 5 to thereby open the latter. Voltage $V_5$ is at zero magnitude, and therefore amplifiers 12 and 13 are not provided with any supply bias voltage. Accordingly, amplifiers 12 and 13 are not operative and voltages $V_7$ and $V_8$ at diodes $D_6$ and $D_7$ are at zero magnitude.

The closed position of switch SW-2 means that voltage $V_3$ is at a magnitude corresponding to the predetermined magnitude of D.C. control voltage $V_2$. Voltage $V_3$ is applied to control input 6a of negative logic-controlled switch 6 to thereby open the latter. Voltage $V_4$ at zero magnitude is now conducted to playback monitor amplifier 15 to make the latter inoperative; voltage $V_4$ is also conducted to the input terminal 12a of amplifier 12 so as not to cutoff the latter; and voltage $V_4$ is further conducted to the input terminal 16a of positive logic-controlled switch 16 to open the latter. Voltage $V_3$ is also conducted to record monitor amplifier 26 to supply bias to the latter; voltage $V_3$ is also conducted to amplifier 25 to supply bias to the latter; voltage $V_3$ is also conducted to bias oscillator 27 to energize the latter; and voltage $V_3$ is also conducted to input terminal 24a of positive logic-controlled switch 24 to close the latter and short terminal 22 directly to ground.

Since amplifiers 12, 13 and 15 are all inoperative, and only amplifiers 3, 25 and 26 are functioning, the selected source data signal is conducted from junction 40 along conductive path 44 to terminal 46 and thereupon to adjustable recording level device or variable resistor $VR_2$. The adjusted signal is fed to both terminals 48 and 50. From terminal 48, the adjusted signal is amplified in amplifier 25, conducted to terminal 41, supplied to bias trap 28 and from there conducted to tape head 23. At the same time, the bias oscillator 27, which is energized by voltage $V_3$ that is supplied from terminal 43, supplies its signal to tape head 23. From terminal 50, the adjusted signal is amplified in record monitor amplifier 26 and thereupon supplied to meter drive 7, rectifier 29 and meter 20. The pointer of meter 20 deflects to thereby indicate and monitor the output voltage record level of the selected source data signal to be recorded by tape head 23.

4. Fourth Operating Condition

In the fourth operating condition, the record mode has been selected by switch SW-2, and the second switching state has been selected by switch SW-1. Arm 11 has been moved to switch terminal 8a to thereby select the microphone data signal at terminal 1e. The D.C. control voltage $V_2$ is again supplied to all the components previously mentioned for the first operating condition. As noted above, no signal is present at common input terminal 10. Amplifier 3 is inoperative, and voltage $V_{10}$ is of zero magnitude. This means that voltage $V_{10}$ is applied to bilateral switch 5 to thereby close the latter. Control voltage $V_2$ therefore passes through switch 5, and the generated voltage $V_5$ has a magnitude corresponding to the predetermined magnitude of the control voltage $V_2$. Voltage $V_5$ is conducted to both amplifier 12 and amplifier 13 to supply bias to both of the latter.

The closed position of switch SW-2 means that voltage $V_3$ is at a magnitude corresponding to the predetermined magnitude of the D.C. control voltage $V_2$. Voltage $V_3$ is applied to control input 6a of bilateral switch 6 to thereby open the latter. Voltage $V_4$ of zero magnitude is now conducted to amplifier 15 to make the latter inoperative; voltage $V_4$ is also conducted to the input terminal 12a of amplifier 12 so as not to cutoff the latter; and voltage $V_4$ is further conducted to input 16a of bilateral switch 16 to open the latter. Voltage $V_3$ is also conducted to record monitor amplifier 26 and to amplifier 25 to supply bias to both latter amplifiers; voltage $V_3$ is again conducted to bias oscillator 27 to energize the latter; and voltage $V_3$ is also conducted to input terminal 24a of positive logic-controlled switch 24 to close the latter and short terminal 22 directly to ground.

Since amplifiers 3, 13 and 15 are all inoperative, and only amplifiers 12, 25 and 26 are operative, the microphone data signal is conducted from terminal 1e, amplified in amplifier 12, and generates a voltage $V_7$ at junction 40. Voltage $V_6$ is at zero magnitude because amplifier 3 has no input; voltage $V_8$ is at zero magnitude because the input to amplifier 13 is grounded. The microphone data signal is conducted from junction 40 along conductive path 44 to terminal 46 and thereupon to variable resistor $VR_2$. The adjusted signal is fed to both terminals 48 and 50. Starting from terminal 48, the adjusted signal is amplified in amplifier 25, conducted to terminal 41, supplied to bias trap 28 and from there conducted to tape head 23. At the same time, the bias oscillator 27, which is energized by voltage $V_3$ that is supplied from terminal 43, supplies its signal to tape head 23. Starting from terminal 50, the adjusted signal is amplified in record monitor amplifier 26 and then supplied to meter drive 7, rectifier 29 and meter 20. The pointer of meter 20 deflects to thereby indicate and monitor the output record voltage level of the microphone data signal to be recorded by tape head 23.

It will be understood that each of the elements described above, or two or more together, may also find a useful application in other types of constructions differing from the types described above.

The electronic switching means is preferably but not necessarily comprised of bilateral switches. A combination electronic switch having multiple inputs and multiple outputs, for example, a ring switch, could also be employed to achieve the aforementioned switching functions. Unnecessary signal wires have therefore been eliminated with the concomitant reduction in the number of parts, size and cost of the switching circuit.

While the invention has been illustrated and described as embodied in a play/record switching circuit for a signal reproducing and recording apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

I claim:

1. A play/record switching circuit for an electrical signal reproducing and recording apparatus of the type having inputs for a plurality of source data signals and a microphone data signal, and tape head means for generating a tape head reproducing signal and for receiving one of said data signals to be recorded, said switching circuit comprising:
 (a) switching-state selector means for selecting between a first switching state in which one of said source data signals is selected, and a second switching state in which one of said microphone data signal and said tape head reproducing signal is selected;
 (b) mode-selector means constituting a single mechanical switch which is solely responsive for selecting between a play and a record mode of operation for the apparatus;
 (c) first actuatable electronic means for processing the selected one of said source data signals to thereby generate a processed source data signal;
 (d) second actuatable means for processing the selected microphone data signal to thereby generate a processed microphone data signal;
 (e) third actuatable means for processing the selected tape head reproducing signal to thereby generate a processed tape head reproducing signal in said play mode;
 (f) fourth actuatable means for processing one of said data signals to be recorded by said tape head means in said record mode;
 (g) electronic circuit means for generating a D.C. voltage signal and for conveying the same to each of said actuatable processing means for actuating the latter; and (h) electronic switching means for selecting at least one of said processing means in dependence upon the selected switching state and the selected mode, including logic-controlled electronic switches electrically connected to said electronic circuit means and operative in dependence upon the magnitude of said same D.C. voltage signal which actuates the processing means for selecting said first processing means in said play mode upon selection of said first switching state, for selecting said third processing means in said play mode upon selection of said second switching state, for selecting said first and fourth processing means in said record mode upon selection of said first switching state, and for selecting said second and fourth processing means in said record mode upon selection of said second switching state.

2. The switching circuit of claim 1; and further comprising means for monitoring one of said processed signals, including monitor reproducing means and monitor recording means, said monitor reproducing means being selected by said electronic switching means in dependence upon the magnitude of said D.C. control signal for monitoring said processed source data signal in said play mode upon selection of said first switching state, and for monitoring said processed tape head reproducing signal in said play mode upon selection of said second switching state, and said monitor recording means being selected by said electronic switching means in dependence upon the magnitude of said D.C. control signal for monitoring said processed source data signal in said record mode upon selection of said first switching state, and for monitoring said processed microphone data signal in said record mode upon selection of said second switching state.

3. The switching circuit of claim 1, wherein said switching-state selector means is a mechanical switch having a manually-movable armature mounted for movement between a plurality of first positions each corresponding to a respective input for said source data signals, and a second position in which none of said source data signals are selected.

4. The switching circuit of claim 1, wherein said switching-state selector means includes a plurality of diodes each mounted between said control signal-generating means and said first processing means, said D.C. voltage control signal having a magnitude sufficient to bias the diode associated with said selected one of said source data signals into forward conduction.

5. The switching circuit of claim 1, wherein said single mode-selector switch is a single-pole, single-throw mechanical switch having a manually-movable armature mounted for movement between a pair of positions each corresponding to one of said modes of operation.

6. The switching circuit of claim 2, wherein each of said processing means, said monitor reproducing means and said monitor recording means are electrical amplifiers.

7. The switching circuit of claim 1, wherein said electronic circuit means includes a D.C. voltage regulator.

8. The switching circuit of claim 1, wherein said electronic switching means includes first bilateral switches which are controlled by positive-logic and second bilateral switches which are controlled by negative-logic, each logic-controlled bilateral switch having a control input terminal to which said D.C. voltage signal is applied.

9. The switching circuit of claim 2, wherein each of said processing means, said electronic circuit means, said electronic switching means and said monitoring means are all incorporated on a single integrated circuit chip.

10. The switching circuit of claim 1, wherein said tape head means constitutes a single play/record tape head which is solely responsible for generating the tape head reproducing signal and for receiving said one data signal to be received.

11. The switching circuit of claim 1 for a multiple channel reproducing and recording apparatus, wherein all of said processing means, said electronic circuit means, and said electronic switching means together constitute a channel control sub-system for controlling one channel of the apparatus; and further comprising a plurality of additional channel control sub-systems identical to the first-mentioned sub-system for respectively controlling the other channels of the apparatus; and wherein said single mechanical switch of said mode selector means is operatively connected to all of the channel control sub-systems for selecting either the play mode or the record mode simultaneously for all of the channels of the apparatus.

12. In a multiple channel electrical signal reproducing and recording apparatus of the type having inputs for a plurality of source data signals and a microphone data signal, and tape head means for generating a tape head reproducing signal and for receiving one of said data signals to be recorded, a play/record switching system comprising:

(a) switching-state selector means for selecting between a first switching state in which one of said source data signals is selected, and a second switching state in which one of said microphone data signal and said tape head reproducing signal is selected;

(b) mode-selector means constituting a single mechanical switch which is solely responsible for selecting between a play and a record mode of operation for all channels of the apparatus;

(c) first electronic means for processing the selected one of said source data signals to thereby generate a processed source data signal;

(d) second electronic means for processing the selected microphone data signal to thereby generate a processed microphone data signal;

(e) third electronic means for processing the selected tape head reproducing signal to thereby generate a processed tape head reproducing signal in said play mode;

(f) fourth electronic means for processing one of said data signals to be recorded by said tape head means in said record mode;

(g) electronic circuit means for generating a D.C. voltage signal;

(h) electronic switching means for selecting at least one of said processing means in dependence upon the selected switching state and the selected mode, including logic-controlled electronic switches operative in dependence upon the magnitude of said D.C. voltage signal for selecting said first processing means in said play mode upon selection of said first switching state, for selecting said third processing means in said play mode upon selection of said second switching state, for selecting said first and fourth processing means in said record mode upon selection of said first switching state, and for selecting said second and fourth processing means in said record mode upon selection of said second switching state;

(i) all of said above-mentioned processing means, electronic circuit means and electronic switching means together constituting a channel control sub-system for controlling one channel of the apparatus;

(j) a plurality of additional channel control sub-systems identical to the first-mentioned sub-system for controlling the other channels of the apparatus; and (k) said single mechanical switch of the mode-selector means being operatively connected to all of the channel control sub-systems for selecting either the play mode or the record mode simultaneously for all of the channels of the apparatus.

* * * * *